(12) United States Patent
Ogata

(10) Patent No.: US 8,542,386 B2
(45) Date of Patent: Sep. 24, 2013

(54) ELECTRONICS DEVICE CAPABLE OF WIRELESS COMMUNICATION, ELECTRONICS DEVICE SYSTEM, AND WIRELESS COMMUNICATION METHOD

(75) Inventor: Hideaki Ogata, Yokohama (JP)

(73) Assignee: Seiko Epson Corporation, Tokyo (JP)

( * ) Notice: Subject to any disclaimer, the term of this patent is extended or adjusted under 35 U.S.C. 154(b) by 502 days.

(21) Appl. No.: 13/007,559

(22) Filed: Jan. 14, 2011

(65) Prior Publication Data

US 2011/0235104 A1     Sep. 29, 2011

(30) Foreign Application Priority Data

Mar. 23, 2010   (JP) ................................. 2010-065588

(51) Int. Cl.
*G06F 3/12*     (2006.01)

(52) U.S. Cl.
USPC ............. 358/1.15; 358/407; 455/3.01; 455/7; 455/9

(58) Field of Classification Search
USPC ............. 358/1.13, 1.15, 1.16, 401, 402, 407, 358/413, 425, 442, 469; 455/3.01, 3.03, 455/3.04, 3.05, 7, 9, 11.1, 41.3, 67.11, 560, 455/92, 95, 151.2; 370/254, 255, 353
See application file for complete search history.

(56) References Cited

U.S. PATENT DOCUMENTS
7,194,262 B2    3/2007 Aoki et al.

FOREIGN PATENT DOCUMENTS
| CN | 101621407 A | 1/2010 |
| JP | 2009-231971 | 8/2009 |

*Primary Examiner* — Vu B Hang
(74) *Attorney, Agent, or Firm* — Maschoff Brennan

(57) ABSTRACT

An electronics device, which is connected to a host apparatus via a wireless communication, includes a communication section configured to perform a wireless communication, and a communication control section configured to, if a start-up timing of the electronics device is earlier than any start-up timing of at least one electronics device other than the electronics device, perform control, as a master device, so as to cause the communication section to perform relaying of a wireless communication between the host apparatus and the at least one electronics device other than the electronics device, and if a start-up timing of the electronics device is later than any start-up timing of the at least one electronics device other than the electronics device, perform control, as a sub device, so as to cause the communication section to perform a wireless communication with the host apparatus via the master device.

8 Claims, 7 Drawing Sheets

FIG. 3

|  | COMMUNICATION SETTING INFORMATION CORRESPONDING TO HOST COMPUTER 1 | COMMUNICATION SETTING INFORMATION CORRESPONDING TO PRINTER 2a | COMMUNICATION SETTING INFORMATION CORRESPONDING TO PRINTER 2b | COMMUNICATION SETTING INFORMATION CORRESPONDING TO PRINTER 2c | COMMUNICATION SETTING INFORMATION CORRESPONDING TO MASTER |
|---|---|---|---|---|---|
| SSID | 0 | 1 | 2 | 3 | 4 |
| PASSWORD | p | a | b | c | x |
| COMMUNICATION SCHEME | Wep | Wep | Wep | Wep | Wep |

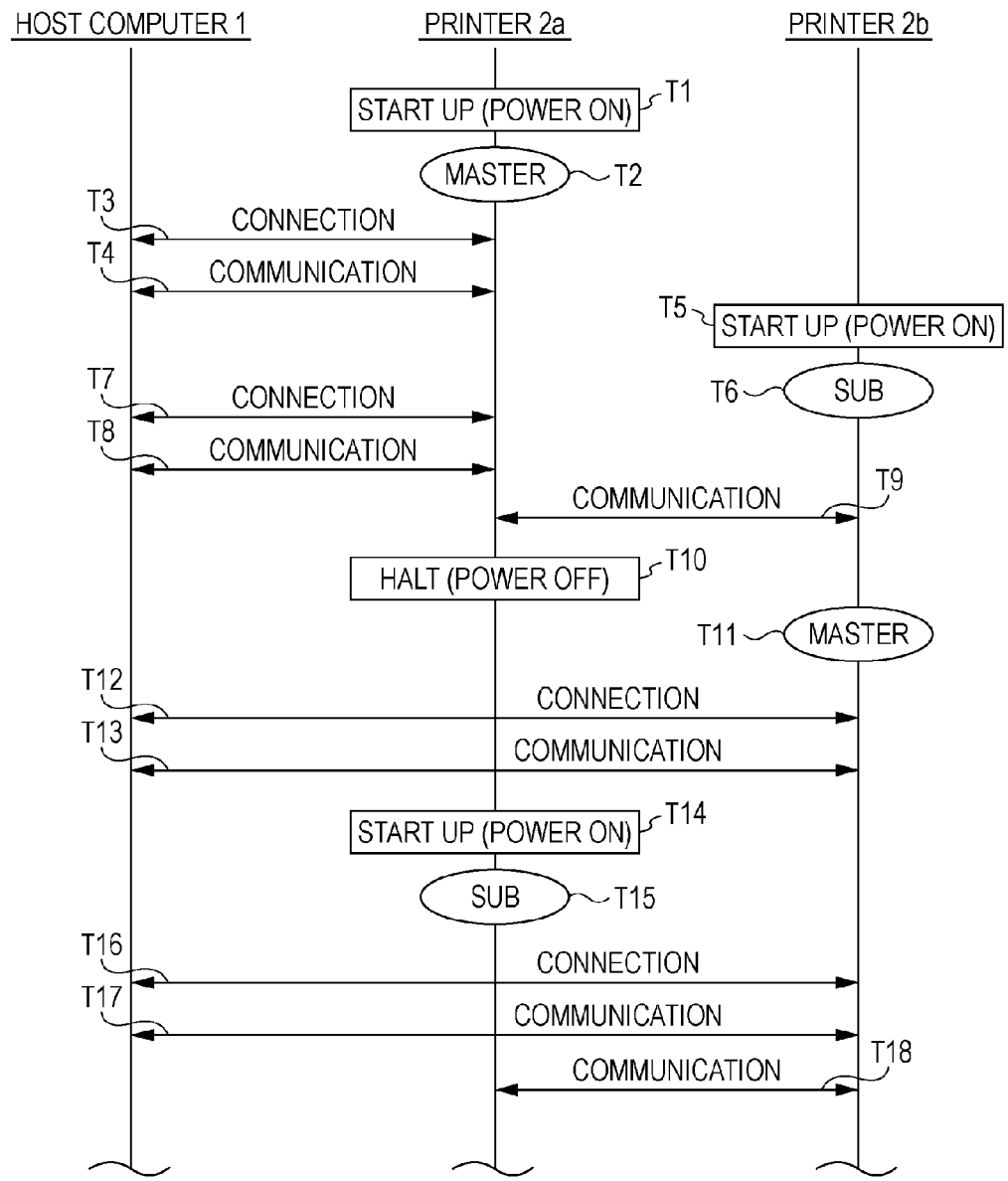

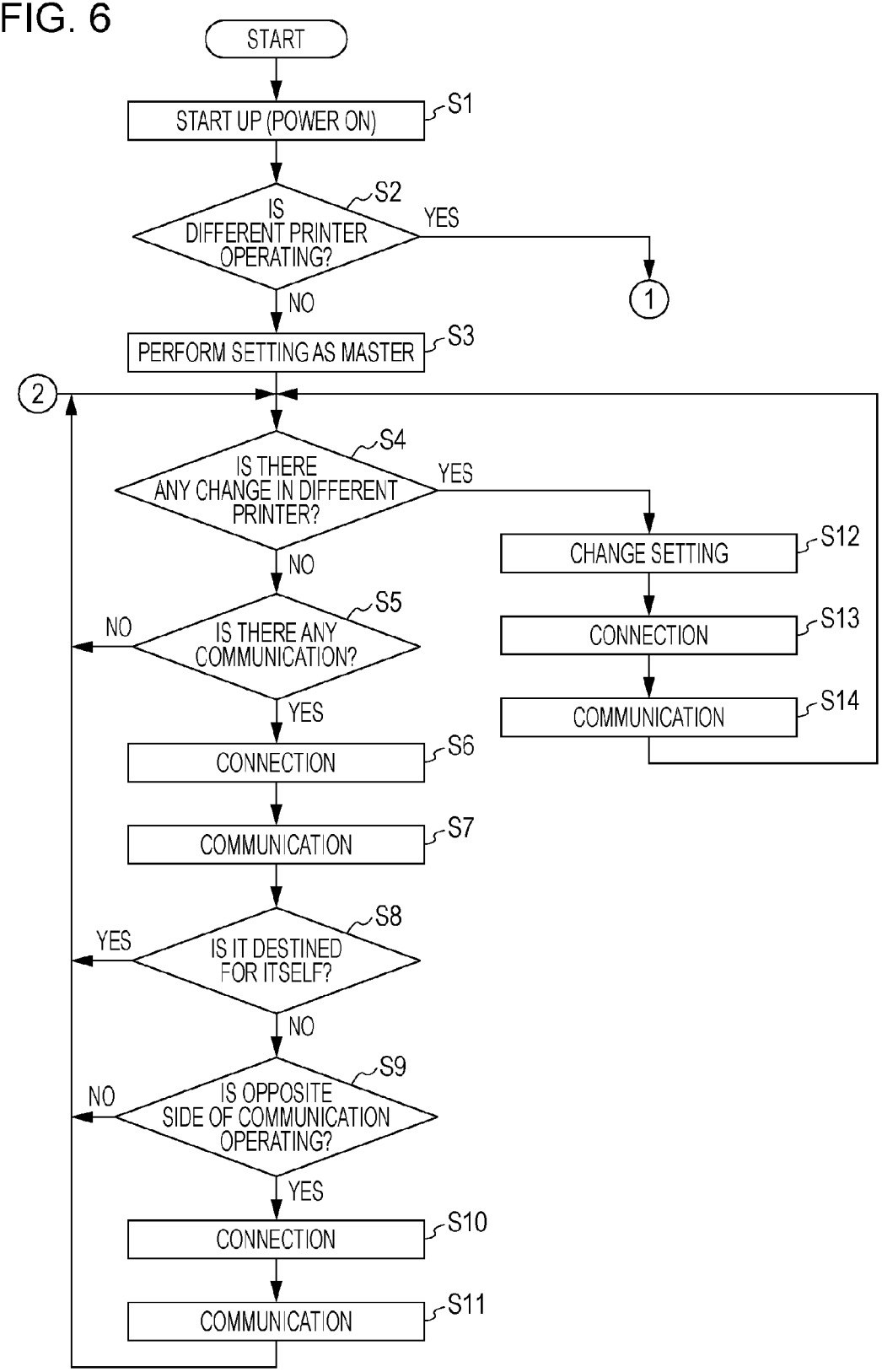

ELECTRONICS DEVICE CAPABLE OF WIRELESS COMMUNICATION, ELECTRONICS DEVICE SYSTEM, AND WIRELESS COMMUNICATION METHOD

BACKGROUND

1. Technical Field

The present invention relates to electronics devices and the like which are utilized via a wireless communication, and in particular, it relates to an electronics device and the like, which is configured to, under an environment where a host device and a plurality of electronics devices are provided, enable automatically performing flexible wireless communications between the host device and the individual electronics devices.

2. Related Art

An environment, under which a personal computer communicates with electronics devices, such as a printer and a facsimile machine, via a wireless communication, and thereby, utilizes functions of the respective electronics devices, has been in widespread use. For a wireless communication performed under such an environment, there are two methods, one being an infrastructure mode, in which an access point functioning as a relay point is provided, the other one being an ad-hoc mode, in which point-to-point communications are performed by respective pairs of electronics devices.

In the case where, in a house, a small-scale office or the like, an access point, such as a broadband router, is not provided, inevitably, a wireless communication needs to be performed by using the above-described ad-hoc mode, and in such a case, in order to perform switching of electronics devices to be communicated, it is necessary for users to change settings of the wireless communication.

Further, as one of related technologies, in JP-A-2009-231971, a method for establishing an ad-hoc network between two apparatuses has been proposed.

In the case where a wireless communication between any two ones of a plurality of electronics devices is performed by using the above-described ad-hoc mode, there has been a disadvantage in that, in order to change an opposite device of the communication, as described above, setting changes are necessary to be made by user operations, and this necessity of setting changes leads to a trouble for users. Further, there has been also a disadvantage in that, even though an electronics device that is not set as an opposite device of the wireless communication in the above-described settings at that timing attempts to communicate, the communication cannot be performed until completion of the above-described setting changes that are to be made by users. Furthermore, performing a wireless communication by using the above-described infrastructure mode that is realized by providing an access point, such as a broadband router, takes time and cost consistent with the provision of the access point.

Accordingly, as one of methods for solving the above-described disadvantages, a method, which enables solution of the disadvantages at the sides of electronics devices that are utilized by a personal computer, has been desired.

SUMMARY

Therefore, an advantage of some aspects of the invention is to provide an electronics device and the like, which is utilized via wireless a communication, and is configured to, under an environment where a host device and a plurality of electronics devices are provided, enable automatically performing flexible wireless communications between the host device and the individual electronics devices.

An electronics device according to a first aspect of the invention, which is connected to a host apparatus via a wireless communication, is configured to, if a start-up timing of the electronics device is earlier than any start-up timings of electronics devices other than the electronics device, each of which is connected to the host apparatus via a wireless communication, and further, is in an operating condition, as a master device, relay wireless communications between the host apparatus and the electronics devices other than the electronics device, and if a start-up timing of the electronics device is later than any start-up timings of the electronics devices other than the electronics device, as a sub device, perform a wireless communication with the host apparatus via a master device that is one of the electronics devices other than the electronics device.

Further, in the electronics device according to the first aspect, preferably, in the host apparatus, communication information corresponding to the master device is set as a communication recipient, in the case where the electronics device is the master device, communication information corresponding to the master device is set as a communication originator, and in the case where the electronics device is the sub device, communication information corresponding to the master device is set as a communication recipient, and further, communication information specific to the electronics device is set as a communication originator.

Further, in the electronics device according to the first aspect, preferably, information associated with an order of the start-up timings of the electronics device and the at least one electronics device other than the electronics device is retained, and on the basis of the information, a determination as to whether the start-up timing is earlier or later is made.

Further, in the electronics device according to the first aspect, preferably, the wireless communication is performed by using an ad-hoc mode.

Further, in the electronics device according to the first aspect, preferably, the electronics device has two communication systems, and when functioning as the master device, one of the two communication systems is used for a communication with the host computer, and the other one of the two communication systems is used for a communication with the at least one electronics device other than the electronics device.

Further, in the electronics device according to the first aspect, preferably, the wireless communication is performed by using an infrastructure mode, and when functioning as the master device, the electronics device functions as an access point.

In an electronics device system according to another aspect of the invention, which includes a host apparatus and a plurality of electronics devices, the host apparatus and the plurality of electronics devices being connected to one another via a wireless communication, an electronics device, the start-up timing of which is the earliest start-up timing of those of electronics devices each being in an operating condition among the plurality of electronics devices, relays a wireless communication between the host apparatus and the electronics devices other than the electronics device, and each of the electronics devices other than the electronics device performs a wireless communication with the host apparatus via the electronics device whose start-up timing is the earliest start-up timing.

In a wireless communication method according to a further aspect, which is used for an electronics device system including a host apparatus and a plurality of electronics devices, the host apparatus and the plurality of electronics devices being connected to one another via a wireless communication, an electronics device, the start-up timing of which is the earliest start-up timing of those of electronics devices each being in an operating condition among the plurality of electronics devices, relays a wireless communication between the host apparatus and at least one electronics device other than the electronics device, and each of the electronics devices other than the electronics device performs a wireless communication with the host apparatus via the electronics device whose start-up timing is the earliest start-up timing.

BRIEF DESCRIPTION OF THE DRAWINGS

The invention will be described with reference to the accompanying drawings, wherein like numbers reference like elements.

FIG. 3 is a diagram illustrating an example of communication setting information stored in an NVRAM module of an electronics device according to an example of an embodiment of the invention.

FIG. 4 is a time chart illustrating an example of communication processing in an electronics device system according to an example of an embodiment of the invention.

FIG. 6 is a flowchart illustrating an example of a procedure of processes performed by a printer according to an example of an embodiment of the invention.

DESCRIPTION OF EXEMPLARY EMBODIMENTS

Hereinafter, embodiments according to the invention will be described with reference to drawings. In addition, the technical scope of the invention is not limited to such embodiments, but extends to terms set forth in the appended claims and equivalents thereof.

Figure 1:
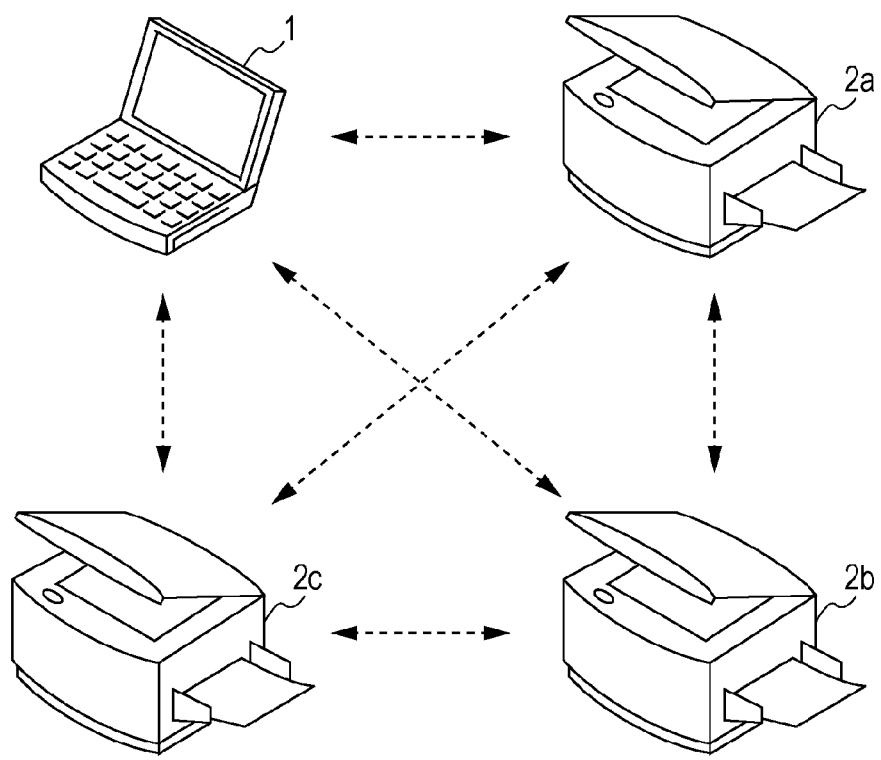
FIG. 1 is a diagram illustrating a configuration associated with an example of an embodiment of an electronics device system to which the invention is applied.

FIG. 1 is a diagram illustrating a configuration associated with an example of an embodiment of an electronics device system to which the invention is applied. Each of printers 2a, 2b and 2c shown in FIG. 1 is configured to, if the printer itself has started up at the earliest timing among operating printers of the three printers, function as a master device and relay wireless communications between a host computer 1 and printers other than itself, and if a printer different from the printer itself functions as a master device, function as a sub device and perform a wireless communication with the host computer 1 via the printer functioning as a master device. Therefore, the electronics device system shown in FIG. 1 is intended to be operated so that, even under an environment where an access point is not provided, wireless communications between the host computer 1 and the plurality of the printers 2 can be performed without any restrictions.

As shown in FIG. 1, in this embodiment example, as an example of an environment where a plurality of electronics devices are utilized by a host computer via a wireless communication, an electronics device system, which is configured to include the host computer 1 and the three printers 2 functioning as the electronics devices utilized by the host computer, is provided. Further, these four devices are configured to, by employing a method to be hereinafter described, be connected to one another via a wireless communication using an ad-hoc mode.

The host computer 1 is a host device for the above-described three printers 2, and is configured by a personal computer and the like. Although omitted from illustration, the host computer 1 is configured to, just like a general computer, include a CPU, a RAM, a ROM, a hard disc, a display apparatus, a pointing device, and the like, and in addition thereto, include a wireless communication device. Further, the host computer 1 includes driver programs for the respective printers 2, and, on the basis of the driver programs, creates print requesting data for the respective printers 2 to transmit the created data to the respective printers 2 via the above-described wireless communication device. Moreover, the host computer 1 is configured to, as pieces of communication setting information necessary for wireless communications, store therein at least a piece of information corresponding to itself and a piece of information corresponding to a master device (a master printer) to be hereinafter described, which are set therein as a piece of information corresponding to a communication originator and a piece of information corresponding to a communication recipient, respectively.

Figure 2:
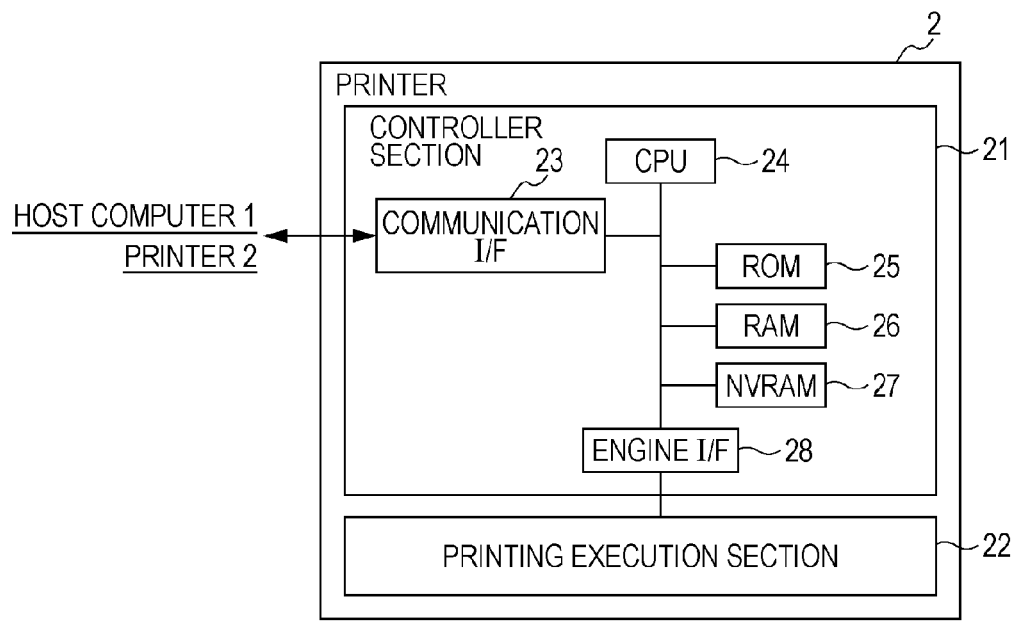
FIG. 2 is a diagram illustrating a configuration of a printer according to an example of an embodiment of the invention.

FIG. 2 is a diagram illustrating a configuration of the printer 2 according to this embodiment example. A configuration of the printer 2, such as shown in FIG. 2, is common to the three printers 2a, 2b and 2c. Further, as described above, the printer 2 is an example of electronics devices utilized via a wireless communication, and can be replaced by a different type electronics device having functions associated with a wireless communication, the same as those of the printer 2, such as a facsimile machine, a projector, or a scanner. Therefore, the electronics device system shown in FIG. 1 may be configured to cause these electronics devices and a printer in addition thereto to coexist. Further, each of the printers 2 corresponds to an electronics device to which the invention is applied.

As shown in FIG. 2, the printer 2 is configured to include a controller section 21 and a printing execution section 22. The controller section 21 is a section configured to, upon receipt of the above-described print requesting data, which is transmitted from the host computer 1 when a printing request has been made therein, convert the print requesting data into signals for the above-described printing execution section 22, and direct the printing execution section 22 to print the converted signals. Further, the controller section 21 is configured to, besides the above-described printing processing, perform control of individual portions of the printer 2 including a communication I/F 23. Moreover, the controller section 21 performs control associated with wireless communications with the host computer 1 and the other printers 2, and this embodiment example is characterized by this control processing for a wireless communication, the content of which will be hereinafter described specifically.

As shown in FIG. 2, the controller section 21 is configured to include the communication I/F 23, a CPU 24, a ROM 25, a RAM 26, an NVRAM 27, and an engine I/F 28. The communication I/F 23 is a section configured to perform wireless communications with the host computer 1 and the other printers 2. Further, the communication I/F 23 is configured to, when the printer 2 including the currently described communication I/F 23 is in an operating condition (i.e., in a power-on condition), transmit a beacon signal including at least a piece of identification information (SSID) corresponding to itself at predetermined intervals of time. The CPU 24 is a controller for the above-described individual processes performed by the controller section 21. The ROM 25 stores therein programs for instructing the CPU 24 to perform operations, and the like. The RAM 26 temporarily stores therein image data that is created in the course of printing processing, and the like. Further, the RAM 26 retains therein a piece of communication setting information corresponding to a communication recipient, which is an opposite side of a wireless communication being performed at that timing, and a piece of communication setting information corresponding to itself (i.e., a communication originator). In addition, the communication setting information will be hereinafter described.

The NVRAM 27, which is a non-volatile memory module, records therein information to be retained even after a power supply of the printer 2 has been turned off, and particularly, in the case of the currently described printer 2, the NVRAM 27 stores therein a piece of communication setting information, which will be hereinafter described, corresponding to the host computer 1 and pieces of communication setting information corresponding to the respective printers 2.

FIG. 3 is a diagram illustrating an example of communication setting information to be stored. As shown in FIG. 3, a piece of communication setting information corresponding to a device includes a service set identifier (SSID) for identifying the device itself, a pass word and a communication scheme. Further, the piece of communication setting information corresponding to a communication originator and the piece of communication setting information corresponding to a communication recipient, both of which are set in the RAM 26, are included in information communicated by the currently described printer 2, and once these pieces of communication setting information correspond to those being set at a receiving-side device, respectively, a communication therebetween is established.

As shown in FIG. 3, each of the printers 2 stores therein pieces of communication setting information corresponding to respective devices included in the electronics device system, and a piece of communication setting information corresponding to a master. Here, a master device (a master printer) is a device configured to relay wireless communications between the host computer 1 and the other printers 2, and in the printer 2 having become a master device, this piece of communication setting information corresponding to a master is set as the piece of information corresponding to itself (i.e., a communication originator). Further, a sub device (a sub printer) is a device configured to perform a communication with the host computer 1 via a master device, and in such a sub device, a piece of communication setting information corresponding to the sub device itself is set as the piece of information corresponding to itself (i.e., a communication originator). For example, in the printer 2a, a piece of communication setting information corresponding to the printer 2a is set as the piece of information corresponding to itself (i.e., a communication originator).

Further, the NVRAM 27 stores therein IP addresses of respective devices included in the electronics device system.

Next, the engine I/F 28 is a section configured to function as an interface between the controller section 21 and the printing execution section 22, and perform processing for converting image data into signals for the printing execution section 22, and the like.

The printing execution section 22 is a section configured to perform printing processing onto a printing medium. Further, as an example, the printing execution section 22 is configured by a photoreceptor, an exposure apparatus, a development apparatus, an intermediate medium, a photographic fixing apparatus, a carrier apparatus for printing media, and the like.

As described above, the electronics device system according to this embodiment example, which is configured in such a manner as described above, has a characteristic in processing for a wireless communication, and hereinafter, the content of the processing for a wireless communication will be described specifically.

FIG. 4 is a time chart illustrating an example of communication processing in an electronics device system according to this embodiment example. Such an electronics device system has a characteristic in which a device for relaying wireless communications changes in accordance with set-up and halt operations of the respective printers 2. An example of the communication processing will be hereinafter described with reference to FIG. 4.

Firstly, under the condition where all the printers 2 are in a halting condition, the printer 2a starts up subsequent to turning on of a power supply of the printer 2a (T1). In this case, the printer 2a is only the printer 2 in an operating condition (in a non-halting condition) among the printers 2, and thus, the printer 2a becomes a master device, which was described above (T2). Further, upon detection of a wireless communication from the host computer 1, as described above, since a communication recipient thereof is set to a master device, the printer 2a establishes a connection to the host computer 1 (T3), and performs a communication therewith (T4).

Next, the printer 2b starts up subsequent to turning on of a power supply of the printer 2b (T5). In this case, since the printer 2a has started up in advance, the printer 2b becomes a sub device, which was described above (T6). Further, upon detection of a communication destined for the printer 2b from the host computer 1, in the same procedure as described above, since, in the host computer 1, a piece of information corresponding to a communication recipient of wireless communications transmitted therefrom is set to a piece of information corresponding to a master device, the printer 2a establishes a connection to the host computer 1 once (T7), and performs a communication therewith (T8). Subsequently, from an IP address contained in communication information, the printer 2a acknowledges that the communication is destined for the printer 2b, and transmits received information to the printer 2b (T9). Specifically, the printer 2a changes the above-described piece of communication setting information corresponding to a communication recipient to a piece of communication setting information corresponding to the printer 2b, which is stored in the NVRAM 27, and performs a wireless communication. Further, in response thereto, the printer 2b establishes a connection to the printer 2a, and performs a communication therewith. In addition, in the printer 2 that has become a sub-device, the above-described setting of a communication recipient is set to a piece of communication setting information corresponding to a master.

Figure 5A:
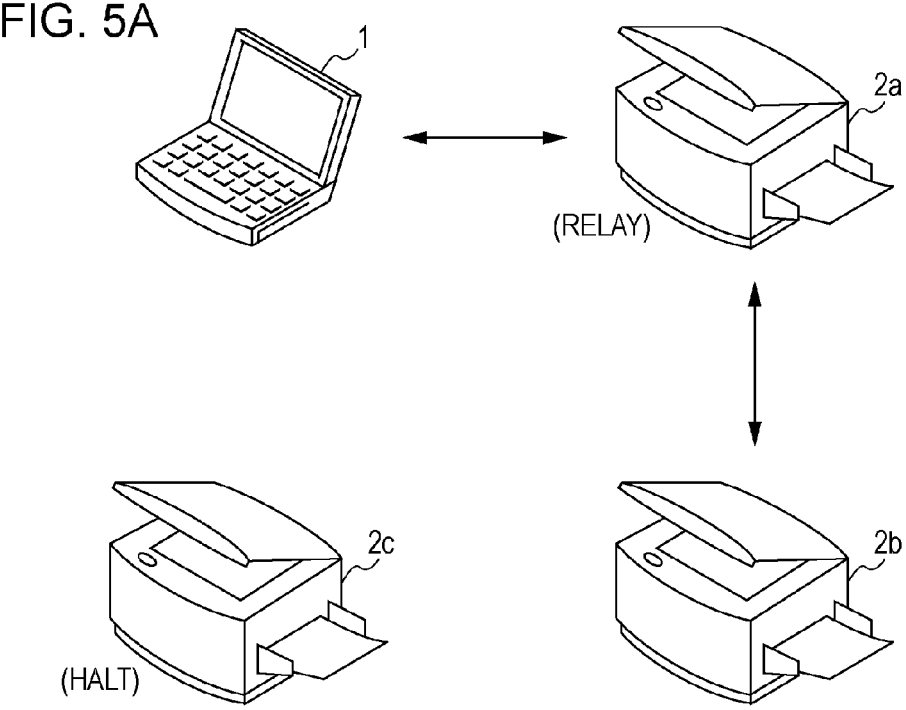
FIGS. 5A and 5B are diagrams each illustrating an example of a relay of a wireless communication in an electronics device system according to an example of an embodiment of the invention.
Figure 5B:
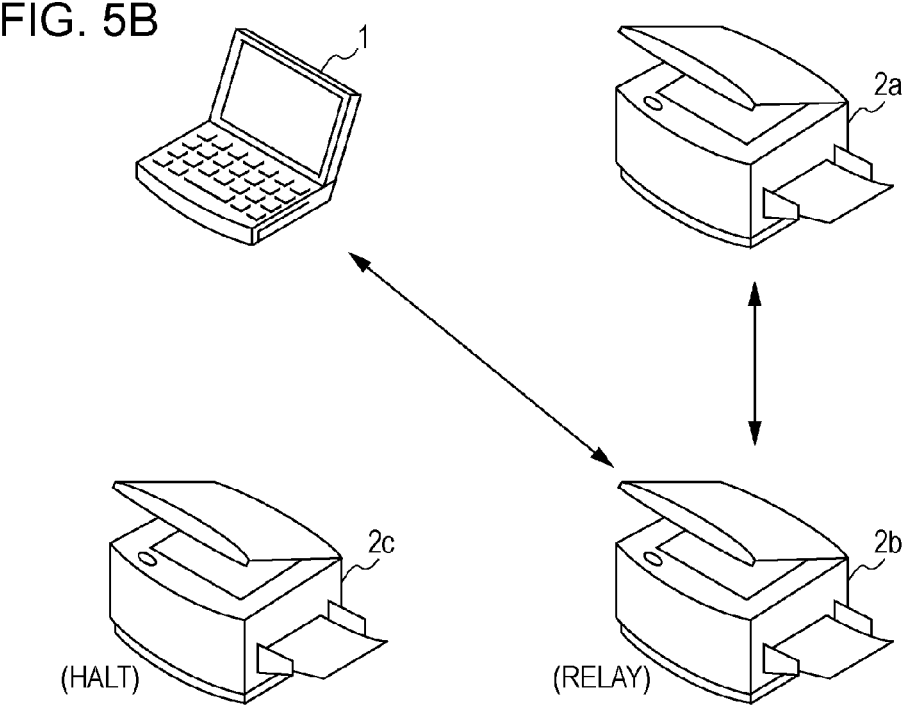

FIGS. 5A and 5B are diagrams each illustrating an example of a relay of wireless communications in an electronics device system according to this embodiment example. In a condition shown in FIG. 5A, which corresponds to a condition resulting from the above-described processes T7 to T9, the printer 2a having become a master device relays a wireless communication from the host computer 1 to the printer 2b. In this example, the printer 2c is in a halting condition, and once the printer 2c starts up as a sub device, a wireless communication from the host computer 1 to the printer 2c are also relayed by the printer 2a.

Subsequently, if the printer 2a halts subsequent to turning off of a power supply of the printer 2a (T10), since, among the printers 2, the printer 2b is only the printer 2 in an operating condition at that timing, the printer 2b becomes a master device (T11). In this case, as the above-described piece of communication setting information corresponding to a communication originator, a piece of communication setting information corresponding to a master is inherited from the printer 2a. Upon detection of a wireless communication from the host computer 1, the printer 2b directly establishes a connection to the host computer 1 (T12), and performs a communication therewith (T13).

Subsequently, if the printer 2a starts up again (T14), since the printer 2b has started up in advance, this time, the printer 2a becomes a sub device (T15). Further, upon detection of a communication destined for the printer 2a from the host computer 1, in the same procedure as that in processes T7 to T9, this time, the printer 2b relays the communication (T16 to T18).

In a condition shown in FIG. 5B, which corresponds to a condition resulting from the above-described processes T16 to T18, the printer 2b having become a master device relays a wireless communication from the host computer 1 to the printer 2a. In this example, the printer 2c is in a halting condition, and if the printer 2c starts up as a sub device, a wireless communication from the host computer 1 to the printer 2c is also relayed by the printer 2b.

As described above, in this electronics device system, a master device is determined from among the printers 2 on the basis of start-up timings of the printers 2, and the master device relays wireless communications between the host computer 1 and the other printers 2.

Figure 7:
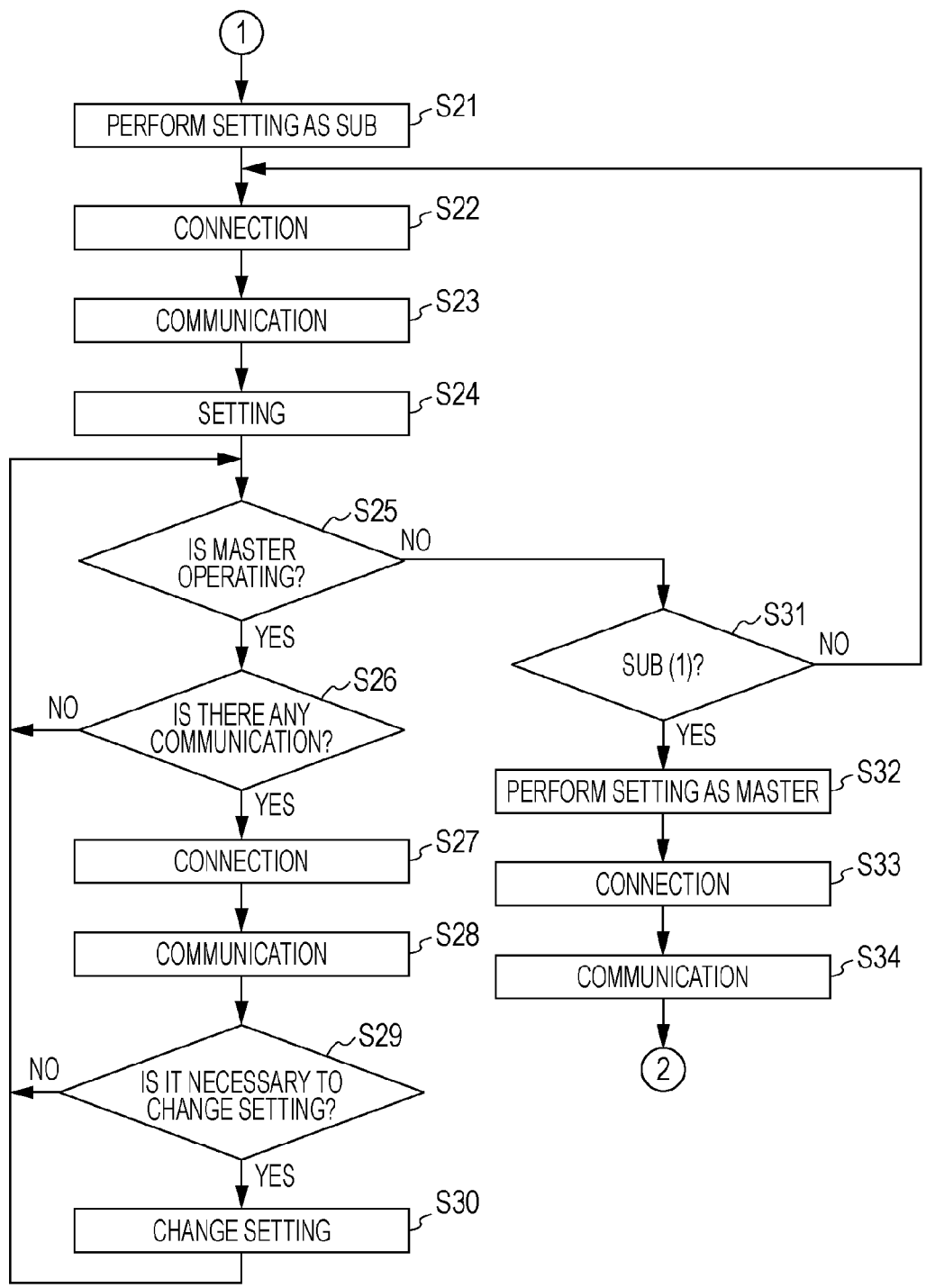
FIG. 7 is a flowchart illustrating an example of a procedure of processes performed by a printer according to an example of an embodiment of the invention.

Next, the content of processing performed by the printer 2 when performing a wireless communication will be hereinafter described more specifically. FIGS. 6 and 7 are flowcharts illustrating an example of a procedure of processes performed by the printer 2. In addition, the content of the following description is the same for each of the printers 2a, 2b and 2c.

Firstly, the printer 2 starts up subsequent to turning on of a power supply of the printer 2 (step S1). Subsequently, the controller section 21 determines whether each of the other two printers 2 is in an operating condition, or not (step S2). Specifically, the controller section 21 confirms whether the communication I/F 23 has received the above-described beacon signal from each of the other two printers 2, or not. The beacon signal must be being transmitted from the communication I/F 23 of the printer 2 that is in a power-on condition.

As a result of the confirmation, if it is confirmed that the beacon signal from at least one of the other two printers 2 exists, that is, at least one of the other two printers 2 is in an operating condition ("Yes" of step S2), the process flow moves to step S21. In this case, the currently described printer 2 becomes a sub device in processes to be hereinafter described.

In contrast, as a result of the confirmation, if it is confirmed that none of the beacon signals from the other two printers 2 exists, that is, neither of the other two printers 2 is in an operating condition ("No" of step S2), since, as described above, each of the other two printers is in a halting condition, in other words, the currently described printer 2 has started up at the earliest timing among the printers 2, the currently described printer 2 becomes a master device, which was described above.

Specifically, the controller section 21 performs a setting as a master device on a wireless communication (step S3). More specifically, the controller section 21 updates a piece of communication setting information corresponding to a communication originator, which is retained in the RAM 26, with the above-described piece of communication setting information corresponding to a master. Further, as an example, the controller section 21 updates a piece of communication setting information corresponding to a communication recipient with a piece of communication setting information corresponding to the host computer 1. Further, the controller section 21 stores master/sub information in the RAM 26. This master/sub information is information indicating that the printer 2 that is a master device at that timing, and the printers 2 that are sub devices at that timing, and in the information, the sub devices are ranked in a descending order from a sub device having started up at the earliest timing. Here, a sub device having started up at the n-th earliest timing is denoted by a sub (n).

The controller section 21 of the currently described printer 2, which has become a master device in such a way as described above, monitors whether there has been any change in a start-up operation or a halt operation of each of the other printers 2, or not (step S4), and whether there has occurred any communication, or not (step S5). Further, if there has occurred a communication ("Yes" of step S5), the controller section 21 establishes a connection to an opposite side of the communication (step S6). If a communication originator of the communication is the host computer 1 or one of the other printers 2, since, as described above, a communication recipient of the communication is a master device, the controller section 21 makes the above-described piece of communication setting information corresponding to a communication recipient, which is retained in the currently described printer 2, be the same as a piece of communication setting information corresponding to the communication originator of the communication, and then, establishes a connection. Further, when the currently described printer 2 initiates a communication from itself, in the same procedure as described above, the controller section 21 of the currently described printer 2 updates the above-described piece of communication setting information corresponding to a communication recipient with a piece of communication setting information specific to a communication recipient of the communication to be initiated, and then, establishes a connection.

Subsequently, the controller section 21 executes communication processing (step S7), and investigates whether the communication is destined for itself, or not (step S8). Specifically, in the case of a reception, the controller section 21 analyzes information having been received, and determines from an IP address, which is indicated as a destination of the received information, whether the received communication is destined for itself, or not. As a result, if it is determined that the received communication is destined for itself ("Yes" of step S8), the controller section 21 issues a direction on the basis of the received information, and then, the process flow returns to step S4.

In contrast, if it is determined that the received communication is not destined for itself or when a communication is initiated from itself ("No" of step S8), the controller section 21 checks whether a device corresponding to the destination of the received communication or a device corresponding to a destination of the communication to be initiated is in an operating condition, or not (step S9). In the same procedure as that in step S2, this check is performed in accordance with existence or unexistence of a beacon signal transmitted from the target device.

As a result, if the device is not in an operating condition ("No" of step S9), the controller section 21 determines that it is impossible to perform a communication with the device, aborts the processing, and then, causes the process flow to return to step S4. In contrast, if the device is in an operating condition ("Yes" of step S9), the controller section 21 establishes a connection to the destination device (step S10). In this case, the above-described piece of communication setting information corresponding to a communication recipient is updated with a piece of communication setting information specific to the destination device. For example, when the printer 2a, which is currently a master device, has received a communication destined for the printer 2b from the host computer 1, the printer 2a updates a piece of communication setting information corresponding to a communication recipient with a piece of communication setting information specific to the printer 2b. Subsequently, the controller section 21 performs communication processing (step S11), and then, causes the process flow to return to step S4.

Next, let us return to step S4, where, if there has occurred any change in a start-up operation or a halt operation of each of the other printers 2 ("Yes" of step S4), the controller section 21 updates the above-described master/sub information on the basis of the start-up operation or the halt operation (step S12). If one of the other printers 2 has started up, the printer 2 becomes a sub device. Further, the controller section 21 adds this information including a start-up rank order of the sub device to the master/sub information. Further, if one of the other printers 2 has halted, a corresponding sub device disappears. Further, the controller section 21 causes this information to be reflected on the master/sub information. In this case, if there exist sub devices each having a start-up rank order lower than that of the disappeared sub device, the start-up rank orders of the respective sub devices are changed so that they can be upgraded by one rank.

Every time the master/sub information is updated in such a way as described above, a master device transmits the updated master/sub information to sub devices, i.e., the other printers 2 (steps S13 and S14). Each of the sub devices uses this master/sub information when becoming a master device. Specifically, the controller section 21 establishes a connection to each of the printers 2, which is a sub device at that timing (S13), and subsequently thereto, performs a communication therewith (S14). Here, processing for the establishment of a connection is performed in the same procedure as that in step S6 or in step S10, and in processing for the communication, the master/sub information having been updated above is transmitted.

Next, let us return to step S2, where, if any one of the other printers 2 is in an operating condition at the timing when the currently described printer 2 has started up ("Yes" of step S2), the currently described printer 2 performs a setting as a sub device in order to become a sub device (step S21 in FIG. 7). Specifically, the controller section 21 of the currently described printer 2 sets a piece of communication setting information for a communication recipient, which is retained in the RAM 26 thereof, to a piece of communication setting information corresponding to a master, and further, sets a piece of communication setting information corresponding to a communication originator, which is also retained in the RAM 26 thereof, to a piece of communication setting information specific to itself. For example, if the currently described printer 2 is the printer 2b, the controller section 21 of the printer 2b sets a piece of communication setting information corresponding to a communication originator to a piece of communication setting information specific to the printer 2b.

Subsequently, since the above-described master/sub information is transmitted from the printer 2, which is a master devise at that time, the controller section 21 establishes a connection to the master device (step S22), and receives information having been transmitted (step S23). Further, the controller section 21 retains (sets) the received master/sub information in the RAM 26 (step S24).

Subsequently, the printer 2 having become a sub device monitors whether the master device is in an operating condition, or not (step S25), and whether any communication to/from itself exists, or not (step S26). Further, if it is detected that any communication to/from itself exists ("Yes" of step S26), the printer 2 establishes a connection without changing the piece of communication setting information corresponding to a communication recipient and the piece of communication setting information corresponding to a communication originator, which have been set above (step S27), and performs communication processing (step S28). Further, if the communication is a transmission of the master/sub information from the master device ("Yes" of step S29), the controller section 21 updates the master/sub information, which has been retained in the RAM 26, with the received master/sub information (step S30), and otherwise ("No" of step S29), in the case of a reception, the controller section 21 issues a direction on the basis of the received information. Subsequent to execution of these processes, the process flow returns to step S25.

In step S25, if it cannot be confirmed that the master device is in an operating condition ("No" of step S25), the controller section 21 checks in accordance with master/sub information having been stored in the RAM 26 whether the currently described printer 2 itself is a sub (1), or not (step S31). In addition, the controller section 21 determines whether a master device is in an operation condition, or not, by confirming whether the above-described beacon signal is transmitted from the printer 2 that is currently a master device. Further, if it is confirmed that the beacon signal is not transmitted from the printer 2 that is currently a master device, the controller section 21 determines that the master device has halted, and checks whether the currently described printer 2 itself is a sub (1), or not (step S31). In addition, the beacon signal transmitted from the printer 2 that is currently operating as a master device has an SSID included in a piece of communication setting information specific to the master device.

As a result of the checking (S31), if the currently described printer 2 itself is not the sub (1), that is, in this embodiment example, the currently described printer 2 itself is a sub (2) ("No" of step S31), the currently described printer 2 itself causes the process flow to return to step 22 with a condition in which the currently described printer 2 is maintained as a sub device as it is. Additionally, in this case, in processing for updating the above-described master/sub information (S24), the currently described printer 2 becomes the sub (1).

In contrast, if the currently described printer 2 itself is the sub (1) ("Yes" of step S31), the currently described printer 2 itself is to be a master device, and therefore, performs a setting as a master device (step S32). This processing is performed in the same procedure as that in step S3. Subsequently, the master/sub information having been updated in this processing is transmitted (steps S33 and S34). This processing is performed in the same procedure as the above-described procedure in steps S13 and S14. Subsequently, the process flow moves to step S4 in FIG. 6 with a condition in which the currently described printer 2 is a master device.

The processing having been described so far is continuously performed until turning off of a power supply of the currently described printer 2.

In addition, processing may be performed so that, without using the above-described communication setting information corresponding to a master, communication setting information specific to a device, which stated up at the earliest timing among the printers 2, is used as the communication setting information corresponding to a master, further, is relayed to each master device, and during a period of time until halts of all devices, if the device that started up at the earliest timing becomes a sub, tentative communication setting information, which is provided in advance, is used as the communication setting information corresponding to a master.

Further, as a modification example of the above-described embodiment example, each of the printers 2 may have two communication systems. In this modification example, the two communication I/Fs 23 corresponding to the respective two communication systems are provided, and a setting of two groups of communication setting information corresponding to a communication recipient and the communication setting information corresponding to an originator, which were described above, is performed. Further, a procedure of possessing and a content of processing are the same as or similar to those of the above-described embodiment example. Further, in this case, for the printer 2 having become a master device, it is possible to use a first system and a second system of the above-described communication systems as a communication system for the host computer 1 and a communication system for the other printers 2, respectively, and thus, it is possible to reduce the possibility of a loss of communication due to overlapping of a communication with the host computer 1 and communications with the other printers.

Furthermore, as another modification example of the above-described embodiment example, an example, in which wireless communications between the devices are performed by using an infrastructure mode, is provided. In this case, a configuration of an electronics device and a content of processing are the same as or similar to those of the above-described embodiment example, and the printer 2 having become a master device functions as an access point.

As described above, in an electronics device system according to the embodiment example or the modification examples thereof, the printer 2, which started up at the earliest timing among the printers 2, functions as a master device, and relays wireless communications from the host computer 1 to the other printers 2, i.e., the other sub devices. Further, once the master device has halted, in accordance with a start-up rank order, a next sub device functions as a master device in the same way as or in a way similar to that of the previous master device.

Further, by constantly handling a master device as a communication recipient, the host computer 1 can communicate with the other printers 2, and thus, once the host computer 1 sets communication setting information specific to the master device as information corresponding to a communication recipient, afterwards, it is unnecessary for the host computer 1 to be change the setting. Further, since the above-described master/sub information is constantly updated and is transmitted to each of the printers 2, changing to a master device can be automatically performed in accordance with the above-described processing.

Accordingly, even under a wireless communication environment where a host device and a plurality of electronics devices are provided, and a dedicated apparatus operating as an access point does not exist, it is possible to automatically perform communications between the host device and the plurality of electronics devices without any setting change operations performed by users.

Further, just providing the above-described functions at the side of an electronics device, such as a printer, is sufficient, so that it is unnecessary to implement new functions in the host device.

As described above, by using a system and devices according to the above-described embodiment example and modification examples thereof, under an environment where a host device and a plurality of electronics devices are provided, it is possible to easily realize such flexible wireless-communication functions that do not trouble any users as functions at the electronics device side.

The entire disclosure of Japanese Patent Application No. 2010-065588, filed Mar. 23, 2010 is expressly incorporated by reference herein.

What is claimed is:

1. An electronics device, which is connected to a host apparatus via a wireless communication, the electronics device comprising:
    a communication section configured to perform a wireless communication; and
    a communication control section configured to, if a start-up timing of the electronics device is earlier than any start-up timing of at least one electronics device other than the electronics device, which is connected to the host apparatus via a wireless communication, and further, is in an operating condition, perform control, as a master device, so as to cause the communication section to perform relaying of a wireless communication between the host apparatus and the at least one electronics device other than the electronics device, and if a start-up timing of the electronics device is later than any start-up timing of the at least one electronics device other than the electronics device, perform control, as a sub device, so as to cause the communication section to perform a wireless communication with the host apparatus via a master device that is one of the at least one electronics device other than the electronics device.

2. The electronics device according to claim 1,
    wherein, in the host apparatus, communication information corresponding to the master device is set as a communication recipient, in the case where the electronics device is the master device, communication information corresponding to the master device is set as a communication originator, and in the case where the electronics device is the sub device, communication information corresponding to the master device is set as a communication recipient, and further, communication information specific to the electronics device is set as a communication originator.

3. The electronics device according to claim 1,
    wherein information associated with an order of the start-up timings of the electronics device and the at least one electronics device other than the electronics device is retained, and
    wherein, on the basis of the information, a determination as to whether the start-up timing is earlier or later is made.

4. The electronics device according to claim 1, wherein the wireless communication is performed by using an ad-hoc mode.

5. The electronics device according to claim 1,
    wherein the electronics device has two communication systems, and
    wherein, when functioning as the master device, one of the two communication systems is used for a communication with the host computer, and the other one of the two communication systems is used for a communication with the at least one electronics device other than the electronics device.

6. The electronics device according to claim 1,
wherein the wireless communication is performed by using an infrastructure mode, and
wherein, when functioning as the master device, the electronics device functions as an access point.

7. An electronics device system including a host apparatus and a plurality of electronics devices, the host apparatus and the plurality of electronics devices being connected to one another via a wireless communication,
wherein an electronics device, the start-up timing of which is the earliest start-up timing of that of at least one electronics device in an operating condition among the plurality of electronics devices, relays a wireless communication between the host apparatus and at least one electronics device other than the electronics device, and
wherein the at least one electronics device other than the electronics device performs a wireless communication with the host apparatus via the electronics device whose start-up timing is the earliest start-up timing.

8. A wireless communication method for an electronics device system including a host apparatus and a plurality of electronics devices, the host apparatus and the plurality of electronics devices being connected to one another via a wireless communication,
wherein an electronics device, the start-up timing of which is the earliest start-up timing of that of at least one electronics device in an operating condition among the plurality of electronics devices, relays a wireless communication between the host apparatus and at least one electronics device other than the electronics device, and
wherein the at least one electronics device other than the electronics device performs a wireless communication with the host apparatus via the electronics device whose start-up timing is the earliest start-up timing.

* * * * *